United States Patent [19]

Robinson, Jr. et al.

[11] Patent Number: 4,559,609
[45] Date of Patent: Dec. 17, 1985

[54] FULL ADDER USING TRANSMISSION GATES

[75] Inventors: William V. Robinson, Jr., Florham Park; Richard R. Shively, Convent Station, both of N.J.

[73] Assignee: AT&T Bell Laboratories, Murray Hill, N.J.

[21] Appl. No.: 464,641

[22] Filed: Feb. 7, 1983

[51] Int. Cl.[4] ............................................. G06F 7/50
[52] U.S. Cl. ..................................... 364/784; 307/472
[58] Field of Search ..................... 364/784, 785, 786; 307/472, 471

[56] References Cited

U.S. PATENT DOCUMENTS

| | | | |
|---|---|---|---|
| 3,582,683 | 6/1971 | Podraza | 307/472 |
| 3,766,371 | 10/1973 | Suzuki | 364/784 |
| 4,006,365 | 2/1977 | Marzin et al. | 307/471 |
| 4,071,905 | 1/1978 | Oguchi et al. | 364/784 |
| 4,367,420 | 1/1983 | Foss et al. | 307/471 |
| 4,417,161 | 11/1983 | Uya | 307/471 |
| 4,471,454 | 9/1984 | Dearden et al. | 364/786 |

OTHER PUBLICATIONS

Smith, "Binary Summation Circuit" *Technical Notes a Publication of RCA* Sep. 1981, 3 Sheets.
Hampel "CMOS/SOS Serial–Parallel Multiplier" *IEEE J. of Solid-State Circuits*, vol. SC-10, No. 5, Oct. 1975, pp. 307–313.
Varadarajan, "Full Binary Adder Employing Fewer Components" *IBM Technical Disclosure Bulletin*, vol. 18, No. 9, Feb. 1976, p. 2880.
Digital Logic–Chapter 5, pp. 141 through 149 by Jefferson C. Boyce.

*Primary Examiner*—David H. Malzahn
*Attorney, Agent, or Firm*—Joseph P. Kearns; John K. Mullarney; Volker R. Ulbrich

[57] ABSTRACT

A binary full adder, including provision for carry digits, is implemented using metal-oxide semiconductor field-effect transistors (MOSFET) in the exclusive-OR configuration. The improved structure realizes economies in space occupancy, and device topology, reduction in power requirement and no loss in propagation time over prior full adders employing conventional logic structures.

12 Claims, 2 Drawing Figures

FULL ADDER USING TRANSMISSION GATES

TECHNICAL FIELD

This invention relates to digital logic circuits and, in particular, to binary full adders.

BACKGROUND OF THE INVENTION

Logic circuits are basic building blocks in digital electronics and process information encoded as two-valued voltage or current levels, usually denoted as 0 and 1. There are three fundamental logic functions: conjunction (AND), disjunction (OR) and negation (NOT). These fundamental functions can be combined in various ways, and most commonly, as NOT with AND and OR to form NAND and NOR circuits from which all combinational logic functions can be realized in integrated circuit (IC) form. Combinational logic is that logic whose output is determined solely by the current inputs, as distinguished from sequential logic which operates on both prior and current inputs. Relationships among combined logic elements are defined by the rules of Boolean algebra.

Among the operations susceptible of implementation by logic circuits are the arithmetic functions of addition, subtraction, multiplication and division. In an arithmetic adder, for example, a combinational network of logic elements is interconnected to generate the sum digit as an output by monitoring combinations of input digits. An output 1 digit is generated only in response to those input combinations set forth in an addition table in a so-called half-adder arrangement. The combinational network can be expanded to generate and operate on carry digits in a full adder arrangement.

A well known full adder is implemented by an array of gates with five NOR gates and three NOT gates in the sum portion and four NOR gates in the carry portion and in its IC form is equivalent to forth metal-oxide semiconductor (MOS) transistors.

It is an object of this invention to provide a more economical full adder using fewer circuit elements and less power than conventional all-NOR gate adders.

SUMMARY OF THE INVENTION

According to this invention, a binary full adder is realized from six pairs of metal-oxide semiconductor field-effect transistor (MOSFET) transmission gates, four inverters and a NOR gate. In an illustrative embodiment two operands and a carry bit and their respective complements are combined in three of the gate pairs to implement a three-input exclusive-OR function. The same operands, the carry bit and their complements are combined in the remaining three gate pairs to form a new carry bit. The inverters serve to provide complememts of the operands and the input carry bit in a conventional manner and the NOR gate aids in forming the new carry bits of the proper sense.

Only one MOSFET transistor is required for each transmission gate, which functions in a manner similar to an AND-gate.

Pluralities of full adders can be further combined in series or parallel arrangements to form multiplication and division circuits. Binary multiplication and division essentially reduce to straightforward left and right shifts of the operands, in conjunction with summations and conditional negations.

Full adders constructed according to the principles of this invention are economical in the number of active elements, the area of silicon substrate utilized, simplification of device topology and reduction in power dissipation in comparison with prior circuits employing NOR gate and AND-OR-INVERT elements. Furthermore, no penalty in operating speed is incurred.

DETAILED DESCRIPTION

Figure 1:
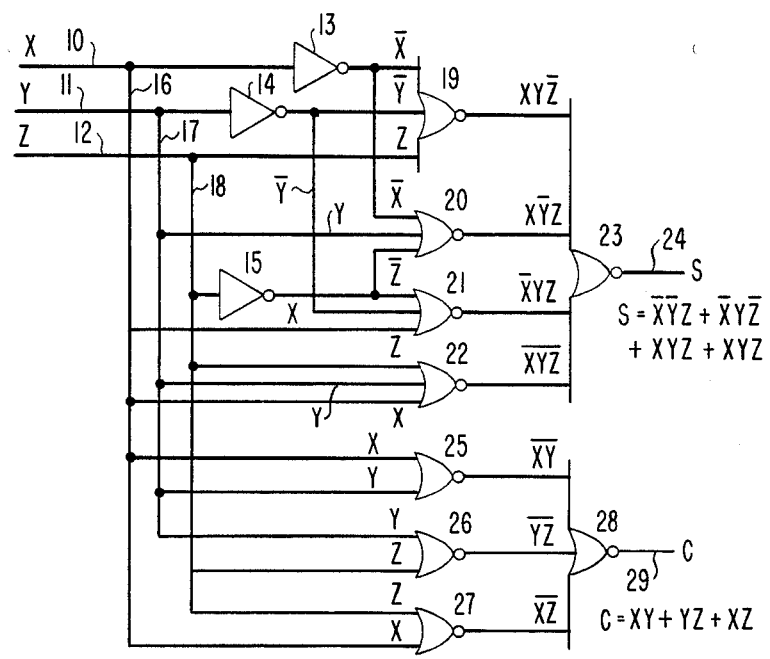
FIG. 1 is a block diagram of a binary full adder using NOR-gates as logic elements known to the prior art.

FIG. 1 is a logic block diagram of a known full adder using NOR gates. A NOR gate produces a high or 1 output only when all inputs are low or 0, and a low or 0 output otherwise. A single input is complemented so that a NOR gate can provide an inverter function. The number of transistors constituting a NOR gate is one more than the number of its inputs. Thus, a two-input NOR gate uses three transistors and a three-input gate uses four transistors.

As is well known, a half adder combines two binary digits to form their sum and a carry. In the case of two 1s the output is 0 and the carry is 1. However, any carry from a preceding operation is ignored. In order to effect a full adder two half adders are cascaded with an OR gate to account for a previous carry or a new carry to produce sum and carry outputs.

For a half adder with binary inputs X and Y the sum output is $$S_o = X\bar{Y} + \bar{X}Y, \quad (1)$$

where the overbar denotes the complement of the value without the overbar, juxtaposition of operands implies the AND function and the plus (+) sign states the OR function.

The carry output can be obtained as $$C = XY \quad (2)$$

Equation (1) is the equivalent of the exclusive-OR function denoted by the encircled plus ($\oplus$) sign. Thus, $$S_o = X \oplus Y \quad (3)$$

A second half adder, takes a sum of equation (1) and a previous carry Z. Thus, $$S = S_o \oplus Z \quad (4)$$

or equivalently $$S = \bar{X}\bar{Y}Z + \bar{X}Y\bar{Z} + X\bar{Y}\bar{Z} + XYZ \quad (5)$$

The new carry becomes $$C = \bar{X}YZ + X\bar{Y}Z + XY\bar{Z} + XYZ \quad (6)$$

Equations (4) and (5) are equivalent to the three-term exclusive-OR function. Thus, $$S = X \oplus Y \oplus Z \quad (7)$$

Equation (6) can be simplified to three terms. Thus, $$C = XY + YZ + XZ \qquad (8)$$

Reference can be had to Chapter 5 of the textbook *Digital Logic* by Jefferson C. Boyce (Prentice-Hall, Inc., Englewood Cliffs, N.J., 1982) for the derivation of the preceding equations and examples of conventional half and full adders using NOR and NAND gates.

FIG. 1 is a block diagram of a full adder known to the prior art and employing logical NOR gates and NOT gates. This adder is capable of handling three binary digits or bits X, Y and Z applied to input lines 10, 11 and 12 and producing therefrom a sum bit S and a carry bit C. Input bits X and Y are assumed to be new operands, augend and addend; and bit Z, to be a carry bit from a previous addition. The complement $\overline{X}$, $\overline{Y}$ and $\overline{Z}$ of each input digit is first generated in NOR gates or inverters 13, 14 and 15.

NOR gates 19 through 23 then generate sum bit S in implementation of equation (5) and its equivalent equation (7). Each NOR gate 19 through 22 combines three permutations of the input bits and their complements as shown. NOR gate 19, for example, combines bits $\overline{X}$, $\overline{Y}$ and Z to form the logic product $\overline{X}\overline{Y}Z$. Similarly, NOR gates 20, 21 and 22 form the logic products $X\overline{Y}\overline{Z}$, $\overline{X}YZ$ and $\overline{X}\overline{Y}Z$, as indicated, in a parallel fashion. Finally, NOR gate 23 combines the four logic products from NOR gates 19 through 22 to form the logic sum $\overline{X}\overline{Y}Z + \overline{X}Y\overline{Z} + X\overline{Y}\overline{Z} + XYZ$. The output of NOR gate 23 appears on output lead 24 as the sum bit S.

Input bits X, Y and Z are extended over leads 16, 17 and 18 as shown in FIG. 1 to provide input signals for NOR gates 25, 26 and 27. Each of these gates combines a pair of input bits X, Y and Z to form the logic products $\overline{XY}$, $\overline{YZ}$ and $\overline{XZ}$ as shown. The latter product bits are further combined in NOR gate 28 to form a single carry bit C on output lead 29.

Each of inverters 13, 14 and 15 contains the equivalent of two transistors. Each of NOR gates 19 through 23 and 25 through 28 contains the equivalent of one more transistor than the number of inputs. Thus, there are six transistors in the inverters and 34 in the NOR gates for a total of 40 equivalent transistors.

Figure 2:
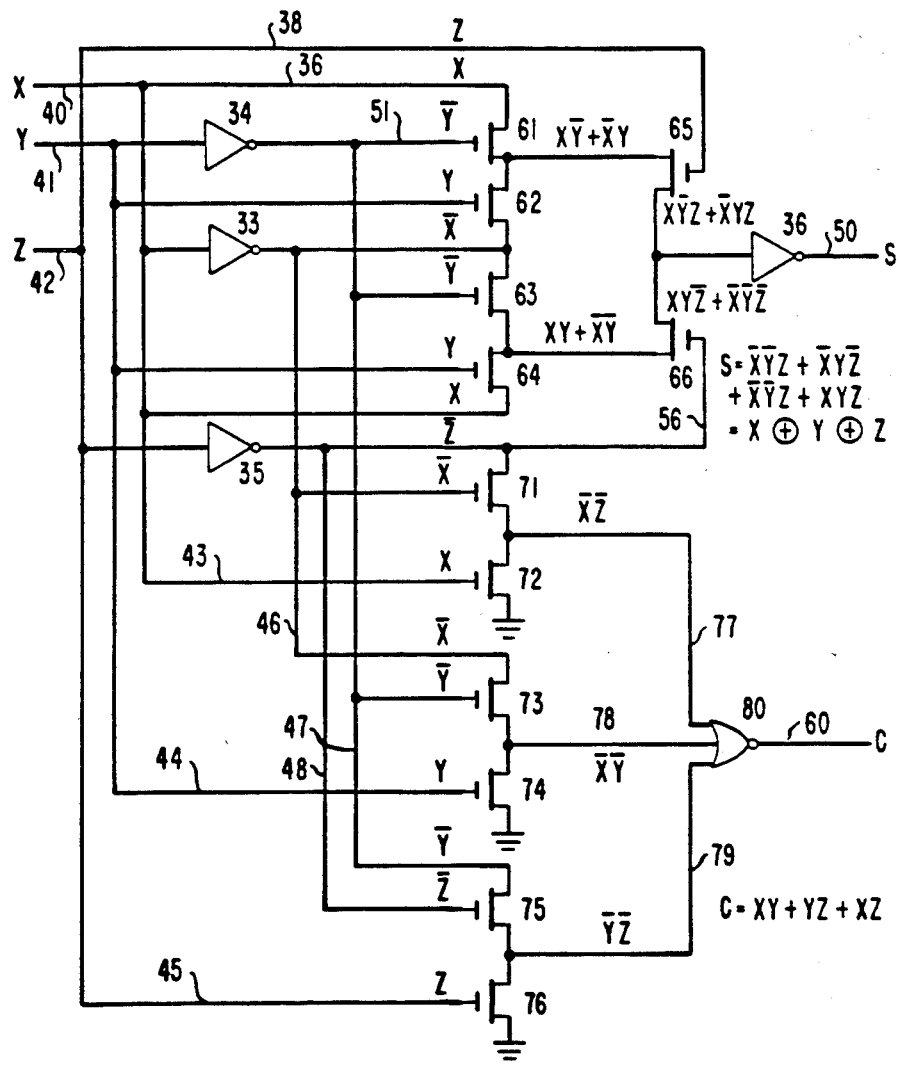
FIG. 2 is a block diagram of the binary full adder using MOSFET transmission gates as logic elements in accordance with this invention.

FIG. 2 is a block diagram of a full adder improved according to this invention by the use of MOSFET gates without the pull-up resistors required by conventional NOR gates.

A MOSFET device is formed by using a silicon substrate which has been doped with a p-type dopant in such a way as to increase the relative density of holes or electrons in two diffused n-type regions. A layer of metal, insulated from the substrate by a deposit of oxide, spans the two n-regions. This metal connection is known as a "gate", and the two n-regions are called respectively, "source" and "drain". The device is symmetrical and thus the source and drain are functionally interchangeable. When a sufficient voltage exists between the metal gate and the substrate, electrons are conducted between the drain and the source connections, essentially shorting the latter connections together. Otherwise, a high resistance exists between the two connections. The gate input is thus analogous to the control lever of a switch.

In like manner, an n-type doping of the substrate, along with p-type source and drain regions, can be used to implement a switch. Holes then migrate between source and drain when the gate is activated.

The simplest MOS logic structure is the transmission gate. Only one transistor is needed to implement the function, where the source lead and the gate lead are used for the two input variables, and the drain provides the output value. The transistor is turned on when the gate is above a certain threshold voltage that assures sufficient current flow through the channel. In other words, the gate acts as a short between source and drain. When the gate is below the threshold potential the switch is opened. An AND operation is thus performed on the inputs.

The MOSFET is usually diagrammed as two parallel bars, one long and one short. The short bar has the gate lead attached to it and the long bar carries the source and drain leads at its ends. In FIG. 2, for example, MOSFET 61 shows lead 51 connected to the gate electrode and lead 36 connected to the source electrode. The remaining lead is connected to the drain electrode. All MOSFETs in FIG. 2 are similarly represented.

FIG. 2 comprises six MOSFETs 61 through 66 acting as transmission gates for generating the sum digit S and six MOSFETs 71 through 76 for generating the carry digit C. The binary inputs X, Y and Z provided on leads 40 through 42 are complemented in inverters or NOT gates 33 through 35 for further processing by the transmission gates. MOSFET 61 in response to source input X on lead 36 and gate input $\overline{Y}$ on lead 51, for example, forms logic produce $X\overline{Y}$ at the drain electrode. Similarly, MOSFETs 62, 63 and 64 form respective logic products $\overline{X}Y$, $\overline{X}\overline{Y}$ and $XY$ at their drain electrodes. MOSFETs 65 and 66 responsive to input Z on lead 38 and input $\overline{Z}$ on lead 56 forms three-element logic products from the two element outputs of MOSFETs 61-62 and 63-64 as indicated. MOSFET pairs 61-62 and 63-64 operate as half adders. The three-element products match those shown in FIG. 1 at the outputs of NOR gates 19 through 22. Sum digit S is formed on lead 50 in the output of inverter 36 and implements equations (4) and (6).

Carry bit C is generated directly in MOSFETs 71, 73 and 75 by forming the logic products $\overline{X}\overline{Z}$, $\overline{X}\overline{Y}$ and $\overline{Y}\overline{Z}$ from complemented input signals on leads 46, 47 and 48. MOSFETs 72, 74 and 76 having common drain-to-source connections with MOSFETs 71, 73 and 75 and having their own drains grounded as shown operate to force an explicit 0 on the respective output leads 77, 78 and 79. Their gates are controlled by the direct inputs X, Y and Z on leads 43, 44 and 45. Without this arrangement the open drains on MOSFETs 71, 73 and 75 would provide an ambiguous drive to NOR gate 80.

The logic products $\overline{X}\overline{Z}$, $\overline{X}\overline{Y}$ and $\overline{Y}\overline{Z}$ on leads 77, 78 and 79 are applied to NOR gate 80 where they are complemented and combined to form the carry bit on output lead 60. The carry output is seen to be defined by equation (8).

Allowing four equivalent transistors for NOR gate 60 and two equivalent transistors each for inverters 33 through 36 and counting the twelve MOSFETs in FIG. 2, the full adder of this invention using MOSFET transmission gates requires only 24 active elements to perform the same function for which the known full adder using NOR gates requires 40 active elements.

While the illustrative embodiment assumed positive logic, i.e., the 1 bit is represented by a positive potential, and p-type MOSFETs, it will be appreciated that the same function can be implemented with negative logic and n-type MOSFETs.

What is claimed is:
1. An adder for binary digits comprising
first and second sources of binary digits to be added, first and second inverters for complementing digits from said first and second sources, first and second transmission gates, each responsive to a pair of direct and complementary digits, one digit each from either of said first and second sources and either of said first and second inverters, for forming products of said digits, and means for combining said products into a sum of products equal to the sum of the digits to be added.

2. The adder for binary digits set forth in claim 1 in which said first and second transmission gates are metal-oxide-semiconductor field-effect transistors of the same conductivity type.

3. The adder for binary digits set forth in claim 1 further comprising a third source of binary digits;

a third inverter for complementing binary digits from said third source;

third and fourth transmission gates responsive respectively to both direct and both complementary digits from said first and second sources and from said first and second inverters for forming products of said digits;

first means for combining said last-mentioned products into a second sum of products;

fifth and sixth transmission gates responsive respectively to the direct and complementary binary digits from said third source and said third inverter and responsive, respectively, to said first and second means for combining for forming triple products of digits from said first, second and third sources; and second means for combining the triple products from said fifth and sixth transmission gates into the triple sum of said input digits.

4. The adder for binary digits set forth in claim 3 in which said first through sixth transmission gates are metal-oxide-semiconductor field-effect transistors.

5. The adder for binary digits set forth in claim 3 further comprising a first plurality of transmission gates for forming products of pairs of digits from said first, second and third sources and from said first, second and third inverters; and means for combining pairs of products from said plurality of transmission gates to form a carry digit.

6. The adder for binary digits set forth in claim 5 in which said transmission gates are metal-oxide-semiconductor field-effect transistors.

7. The adder for binary digits set forth in claim 5 further comprising a second plurality of transmission gates paired one-for-one with each member of said first plurality of transmission gates, first means for connecting one electrode of each of said second plurality of transmission gates to a common reference potential; and second means for connecting the control electrodes of the paired members of each plurality of transmission gates to respective direct and complemented digits from said first, second and third sources, said second plurality of transmission gates serving to force a defined reference output from one gate of a pair when the other gate is open circuited.

8. The adder for binary digits set forth in claim 7 in which said transmission gates are metal-oxide-semiconductor field-effect transistors.

9. The adder for binary digits set forth in claim 1 further comprising a third source of binary digits;

a third inverter for complementing binary digits from said third source;

a first plurality of transmission gates for forming products of pairs of digits from said first second, and third sources and from said first, second, and third inverters, and means for amplifying and combining pairs of products from said first plurality of transmission gates to form carry digits.

10. The adder for binary digits set forth in claim 9 in which each of said first plurality of transmission gates is a metal-oxide semiconductor field-effect transistor.

11. The adder for binary digits set forth in claim 9 further comprising a second plurality of transmission gates paired one-for-one with each member of said first plurality of transmission gates, first means for connecting one electrode of each of said second plurality of transmission gates to a common reference potential, and second means for connecting the control electrodes of the paired members of the said first and second pluralities of transmission gates to respective direct and complemented digits from said first and second sources, said second plurality of transmission gates serving to force a defined reference output from one gate of a pair when the other gate is open circuited.

12. The adder for binary digits set forth in claim 11 in which each of said second plurality of transmission gates is a metal-oxide-semiconductor field-effect transistor.

* * * * *